(12) United States Patent
Saito et al.

(10) Patent No.: US 6,402,529 B2
(45) Date of Patent: Jun. 11, 2002

(54) CARD CONNECTOR

(75) Inventors: Masaaki Saito, Tokyo; Yasuhiro Ono, Yokohama; Toshiyasu Ito, Togane; Minoru Ohara, Ome, all of (JP)

(73) Assignees: Yamaichi Electronics Co., Ltd.; Toshiba Corporation, both of Tokyo (JP)

(*) Notice: Subject to any disclaimer, the term of this patent is extended or adjusted under 35 U.S.C. 154(b) by 0 days.

(21) Appl. No.: 09/777,892

(22) Filed: Feb. 7, 2001

(30) Foreign Application Priority Data

Feb. 8, 2000 (JP) .......................... 2000-030825

(51) Int. Cl.[7] .................. H01R 12/00; H01R 24/00; H05K 1/00; H05K 1/14
(52) U.S. Cl. ................ 439/74; 439/630; 439/64; 361/737
(58) Field of Search .................. 439/74, 945, 55, 439/64, 541.5, 159, 166, 602, 630; 361/737, 753

(56) References Cited

U.S. PATENT DOCUMENTS

| 5,716,221 | A | * | 2/1998 | Kantner .................... 439/64 |
|---|---|---|---|---|
| 5,993,261 | A | * | 11/1999 | Klatt et al. ............... 439/630 |
| 6,102,715 | A | * | 8/2000 | Centofante ............... 439/140 |
| 6,162,089 | A | * | 12/2000 | Costello et al. .......... 439/541.5 |
| 6,174,198 | B1 | * | 1/2001 | Wu et al. ................ 439/541.5 |
| 6,183,292 | B1 | * | 2/2001 | Chen et al. ............. 439/541.5 |
| 6,250,965 | B1 | * | 6/2001 | Neifer ..................... 361/735 |
| 6,261,128 | B1 | * | 7/2001 | Heim et al. .............. 439/326 |
| 6,328,605 | B1 | * | 12/2001 | Walker et al. ............ 439/59 |

* cited by examiner

Primary Examiner—P. Austin Bradley
Assistant Examiner—Edwin A. León
(74) Attorney, Agent, or Firm—Finnegan, Henderson, Farabow, Garrett & Dunner, L.L.P.

(57) ABSTRACT

The first card accommodating portion for accommodating the first card and the second card accommodating portion for accommodating the second card are formed in the connector housing in such a way that a part of the first and second card accommodating portions can be used commonly by the first and second cards. This construction allows two or more kinds of cards with different external shapes and different contact pad positions to be inserted into the connector from one and the same card insertion slot, thus reducing the space occupied by the card connector.

2 Claims, 12 Drawing Sheets

CARD CONNECTOR

This application is based on Japanese Patent Application No. 2000-30825 filed Feb. 8, 2000, the content of which is incorporated hereinto by reference.

BACKGROUND OF THE INVENTION

1. Field of the Invention

The present invention relates to a card connector for electronic devices, such as cellular phones, telephones, PDAs (personal digital assistants), portable audio devices and digital cameras, and more specifically to a card connector which, although it occupies only a small space, can suitably accommodate at least two kinds of cards, one at a time, with different external shapes and different contact pad positions.

2. Description of the Related Art

In electronic devices such as cellular phones, telephones, PDAs and digital cameras, a variety of functions are added by inserting an IC card with a built-in CPU or memory IC, such as a SIM (subscriber identity module) card, an MMC (multimedia card) and an SD (secure digital; super density) card.

In a connector for removably accommodating such an IC card, a plurality of contact terminals made of a metal leaf spring are provided in a connector housing to contact a plurality of contact pads formed on the front or back surface of the inserted IC card to bring the IC card into electrical contact with the electronic device having that connector. The contact pads of the IC card include a power supply pad connected to a power supply line and a plurality of signal pads for transferring various signals. These contact pads are connected via the contact terminals of the card connector to a power supply circuit and various signal processing circuits in the electronic device.

Smart Media (trade name), one of such cards, is smaller in thickness and larger in surface size than other cards and therefore its contact pads are located at different positions than those of other cards. Comparison between the MMC card and the SD card shows that they differ in thickness although their surfaces are similar in shape and size and their contact pad positions are similar.

As described above, there are many IC cards of this kind with different external shapes and different contact pad positions. However, many conventional card connectors can only deal with one kind of card.

In the conventional art, if an electronic device is to accommodate two or more kinds of cards, it is necessary to prepare as many dedicated connectors as the number of different kinds of cards to be accommodated and mount them on a printed circuit board, giving rise to a problem of an increased connector-occupied area on the printed circuit board. On the electronic device side, as many card insertion openings as the number of different kinds of cards must be prepared, increasing the space the card connector occupies in the electronic device housing, which in turn prevents miniaturization of the electronic device.

In the industry of electronic devices using such IC cards, therefore, there has been a growing demand for a card connector structure that can removably accommodate in a single slot two or more kinds of cards with different external shapes and different contact pad positions.

The present invention has been accomplished under these circumstances and it is an object of this invention to provide a card connector occupying a small space and capable of removably accommodating in one and the same slot two or more different kinds of cards with different external shape and contact pad positions.

SUMMARY OF THE INVENTION

According to one aspect, the present invention provides a card connector for exchangeably accommodating at least two cards, or first and second cards, with different thicknesses, different sizes and different alignment positions of a plurality of contact pads, the card connector comprising; a first card accommodating portion defined by a pair of side walls for accommodating the first card, the side walls being adapted to guide side surfaces of the first card; a second card accommodating portion defined by a pair of side walls for accommodating the second card, the side walls being adapted to guide side surfaces of the second card; wherein the first card accommodating portion and the second card accommodating portion are formed in a connector housing so that a part of the first and second card accommodating portions can be used commonly by the first and second cards; and wherein a plurality of first contact terminals to be brought into contact with contact pads of the first card are arranged on one of an upper plate and a lower plate of the connector housing, and a plurality of second contact terminals to be brought into contact with contact pads of the second card are arranged on the other plate of the upper plate and the lower plate.

In this invention, the first card accommodating portion for accommodating the first card and the second card accommodating portion for accommodating the second card are formed in a connector housing so that a part of the first and second card accommodating portions can be used commonly by the first and second cards. This construction allows the first and second cards to be inserted into the connector through one and the same card slot.

First contact terminals to be brought into contact with a contact pads of the first card are arranged on one of an upper plate and a lower plate of the connector housing, and second contact terminals to be brought into contact with a contact pads of the second card are arranged on the other plate.

In this invention, therefore, the first card is inserted into the connector with its surface attached with the contact pads facing up or down so that the contact pads of the first card contact the first contact terminals arranged on one of the upper and lower plates. The second card is inserted into the connector with its surface attached with the contact pads facing up or down in a direction opposite that of the first card so that the contact pads of the second card contact the second contact terminals provided on the lower or upper plate opposite the first contact terminals.

According to another aspects the present invention provides a card connector for exchangeably accommodating at least two cards, or first and second cards, with different thicknesses, different sizes and different alignment positions of a plurality of contact pads, the card connector comprising: a first card accommodating portion defined by a pair of side walls for accommodating the first card, the side walls being adapted to guide side surfaces of the first card; a second card accommodating portion defined by a pair of side walls for accommodating the second card, the side walls being adapted to guide side surfaces of the second card; wherein the first card accommodating portion and the second card accommodating portion are formed in a connector housing so that a part of the first and second card accommodating portions can be used commonly by the first and second cards; and wherein a plurality of first contact terminals to be brought into contact with contact pads of the first card and a plurality of second contact terminals to be brought into contact with contact pads of the second card are arranged on one of an upper plate and a lower plate of the connector housing and at different positions.

In this invention, too, the first card accommodating portion and the second card accommodating portion are formed in the connector housing so that a part of these card accommodating portions can be used commonly by the first and second cards. This construction allows the first and second cards to be inserted into the connector from one and the same card slot.

In this invention, the first contact terminals and the second contact terminals are arranged on one of the upper and lower plates of the connector housing at staggered positions. This construction allows the first and second cards to be inserted into the connector with their faces directed in the same vertical direction.

Because the first card accommodating portion for accommodating the first card and the second card accommodating portion for accommodating the second card are formed in the connector housing so that a part of these card accommodating portions can be used commonly by the first and second cards, it is possible to insert into or remove from the same slot the cards with different external shapes and different contact positions. This in turn reduces the space occupied by the card connector, leading to a reduction in the size of various electronic devices.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, preferred embodiments of this invention will be described in detail by referring to the accompanying drawings.

First, let us explain about three kinds of cards that can be inserted into the card connectors shown below as embodying the invention.

Figure 1:
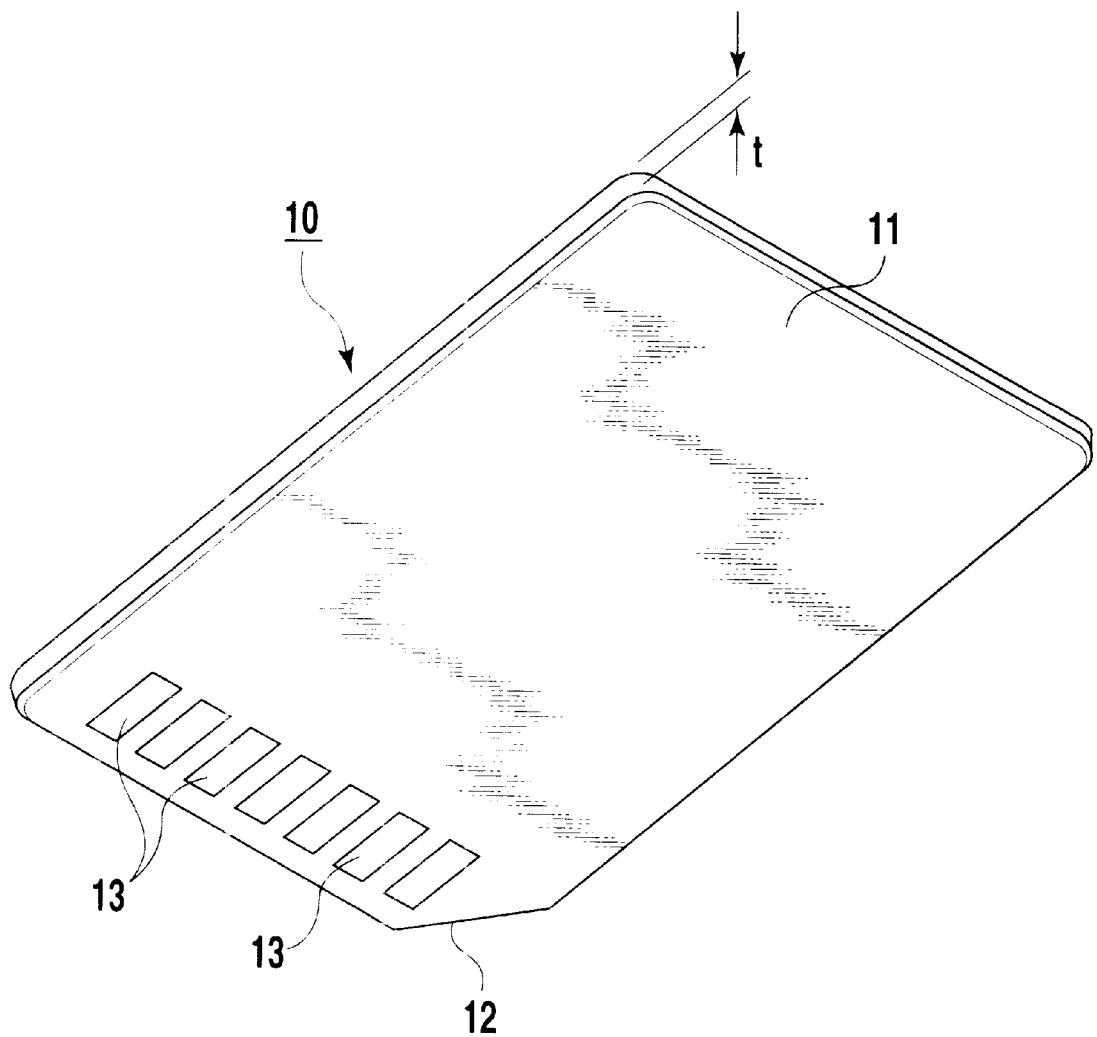
FIG. 1 is a perspective view showing a card of 1-stage thickness type.

FIG. 1 shows an external view of an MMC card as an example of the 1-stage thickness type card 10. In FIG. 1, the 1-stage thickness type card 10 has a card body 11 with a predetermined thickness t, which is formed with a triangular notched portion 12 at the right front end part to prevent an erroneous insertion. At the front end part of the bottom surface of the card body 11 a plurality of contact pads 13 are arranged which are to be connected with an IC circuit in the card.

Figure 2:
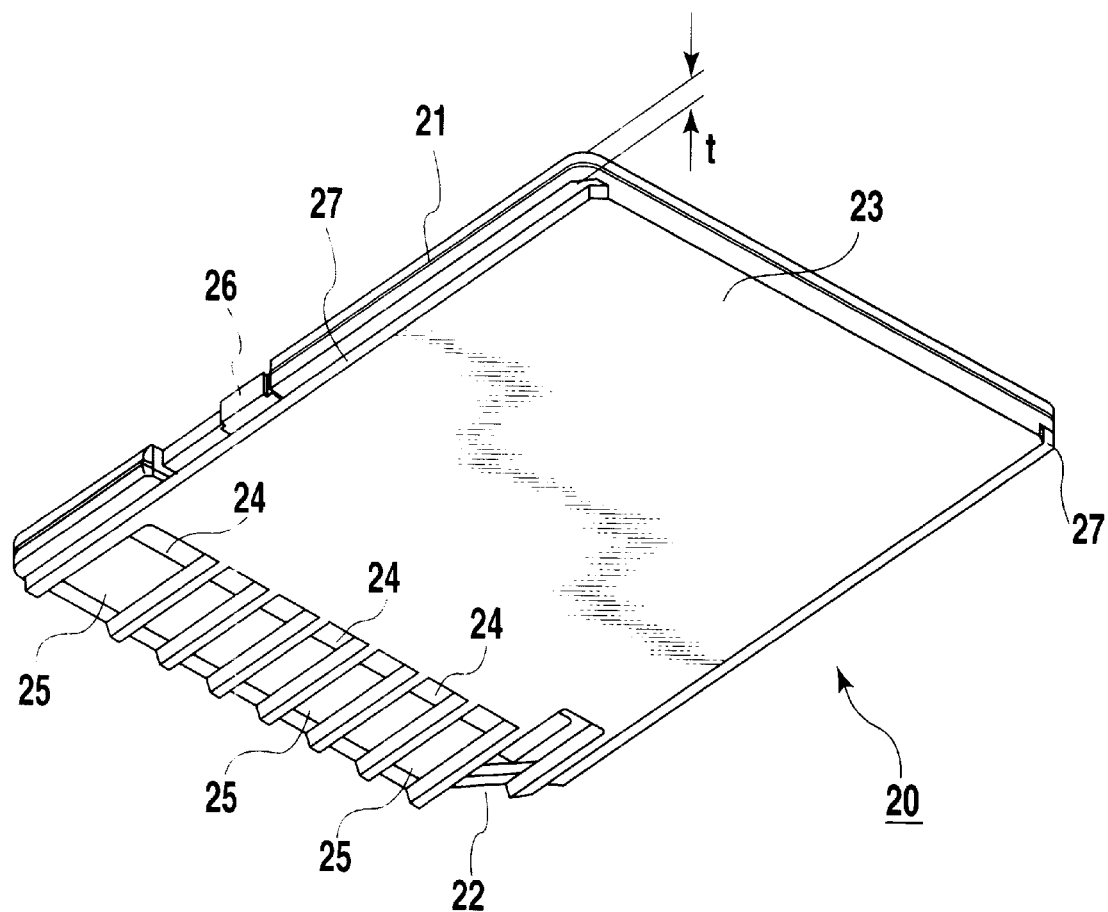
FIG. 2 is a perspective view showing a card of 2-stage thickness type.

FIG. 2 shows an external view of a SD card, as seen from the back surface, as an example of the 2-stage thickness type card 20. The top/bottom surface shape and size of the 2-stage thickness type card 20 are almost equal to those of the 1-stage thickness type card 10 of FIG. 1.

The 2-stage thickness type card 20 has an upper body portion 21 with a thickness t almost equal to that of the card body 11 of the 1-stage thickness type card 10. The upper body portion 21 has a notched portion 22 at the right front end part for preventing an erroneous insertion. On the back surface side of the upper body portion 21 is formed a lower body portion 23 slightly narrower in width than the upper body portion 21. That is, this card 20 has a 2-stage structure in which a step 27 between the bottom surface of the upper body portion 21 and the bottom surface of the lower body portion 23 is formed along both sides of the card. The front end part of the lower body portion 23 is formed with a plurality of recesses 24, on the bottom of which contact pads 25 are arranged. A write protect button 26 is provided at a side wall of the card 20.

Figure 3:
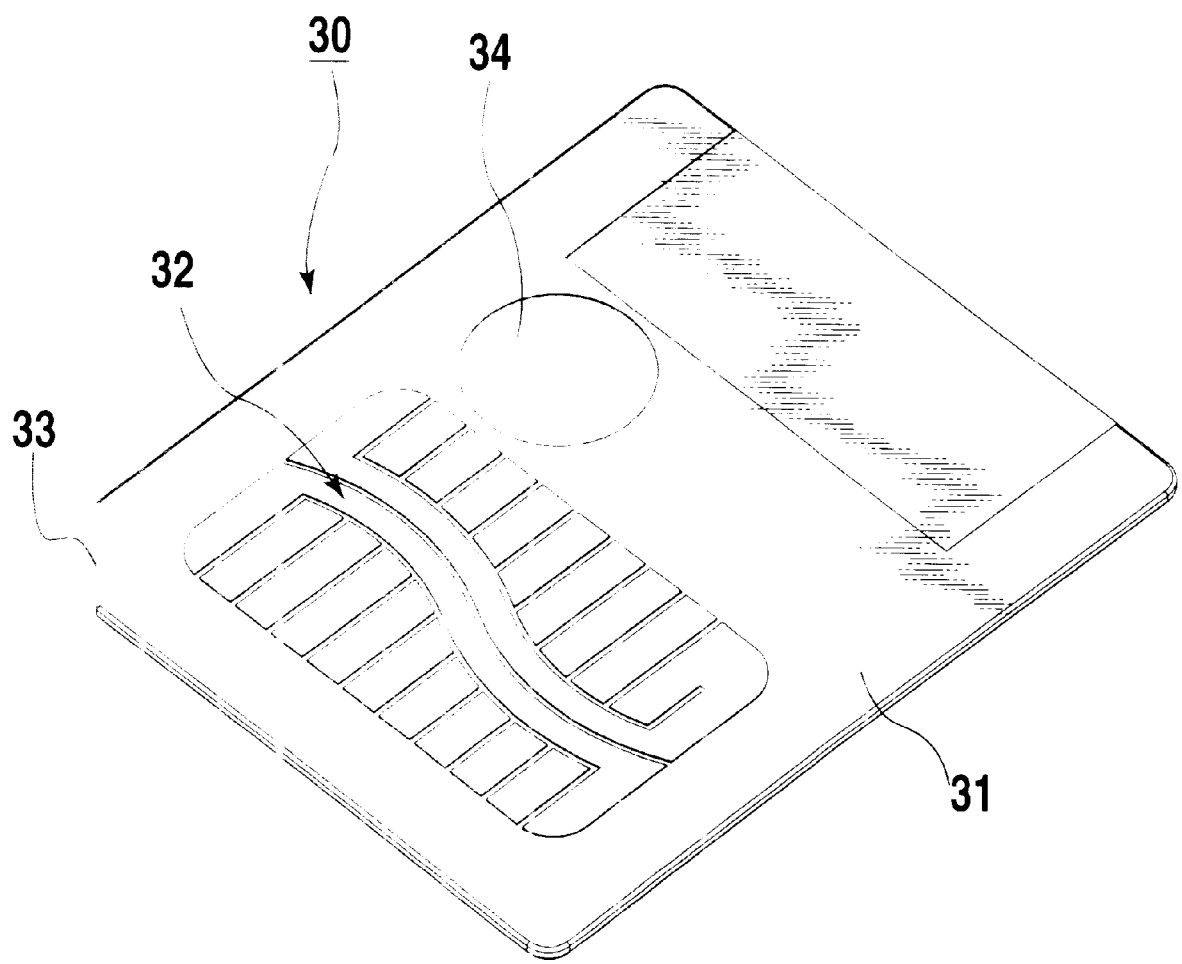
FIG. 3 is a perspective view showing a thin type card.

FIG. 3 shows Smart Media (trade name) as an example of a thin type card 30.

The thin type card 30 has a card body 31 which is larger in surface size but smaller in thickness than the 1-stage thickness type card 10 and 2-stage thickness type card 20. On the front end part of the thin type card 30, there is a contact area 32 where a plurality of contact pads are arranged. At one front corner of the card 30, a notched portion 33 is formed for preventing an erroneous insertion. Denoted 34 is a write protect pad. The thin type card 30 thus has a different arrangement from the 1-stage thickness type card 10 and 2-stage thickness type card 20 in terms of external shape, surface size, thickness and contact pad positions.

[First Embodiment]

Next, the first embodiment of the card connector according to this invention will be explained by referring to FIG. 4 to FIG. 11.

Figure 4:
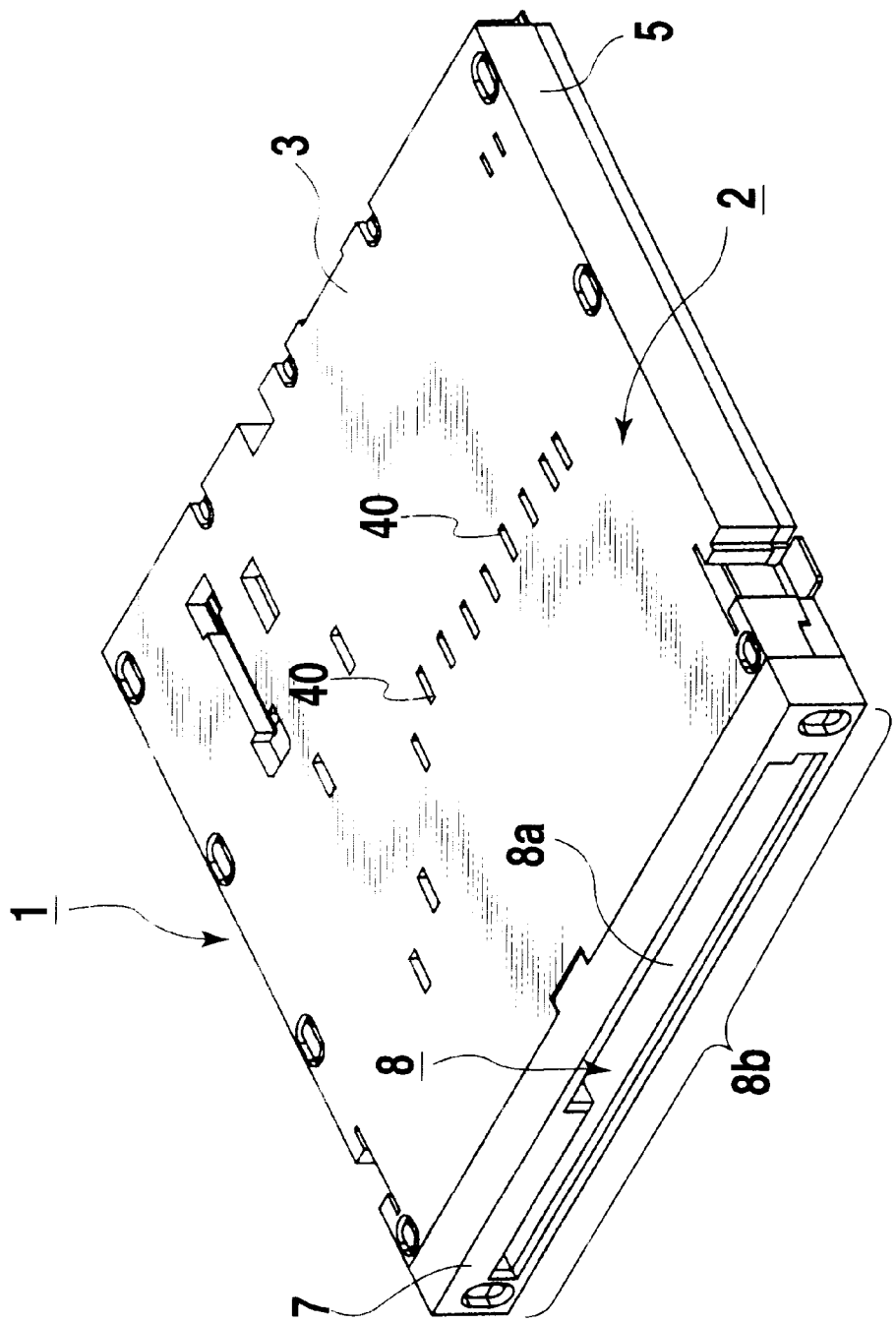
FIG. 4 is a perspective view showing an external construction of a card connector according to one embodiment of this invention.
Figure 5:
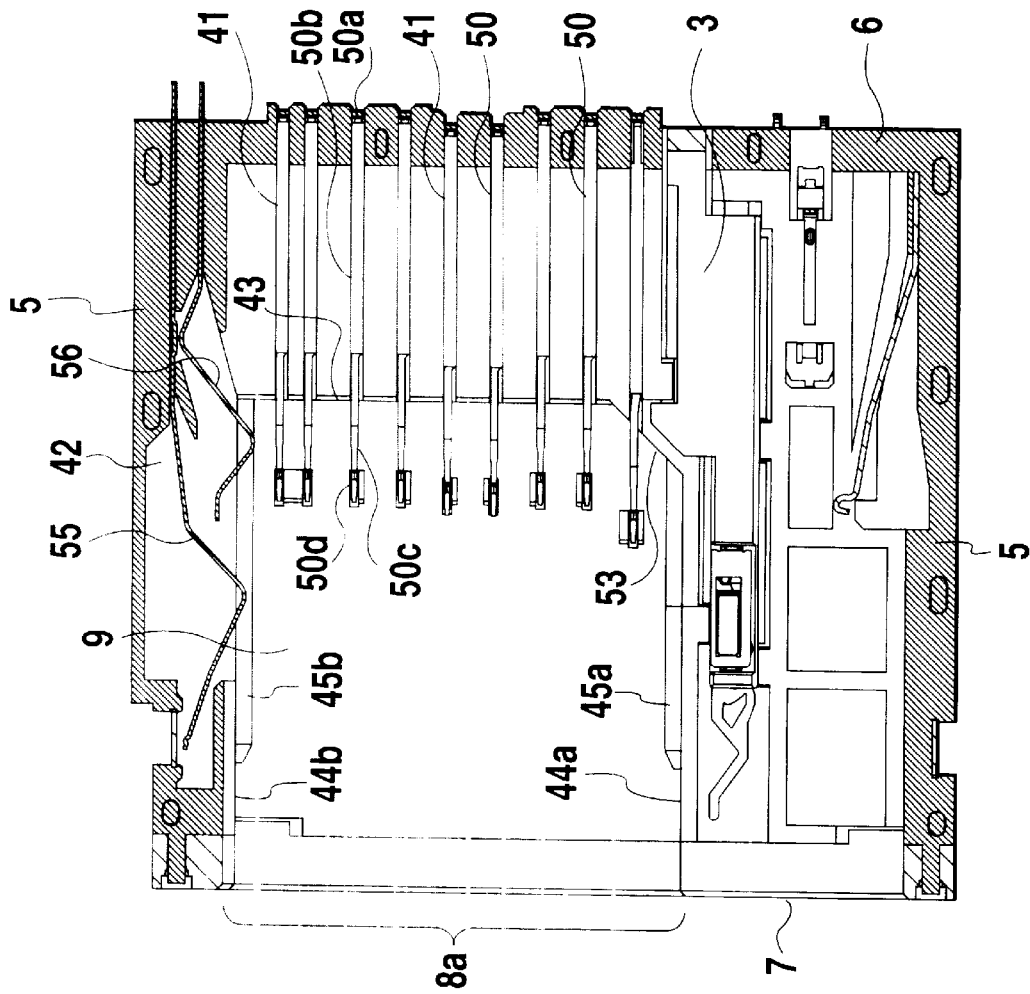
FIG. 5 is a horizontal cross-sectional view of an upper part of the card connector according to the embodiment of the invention.
Figure 6:
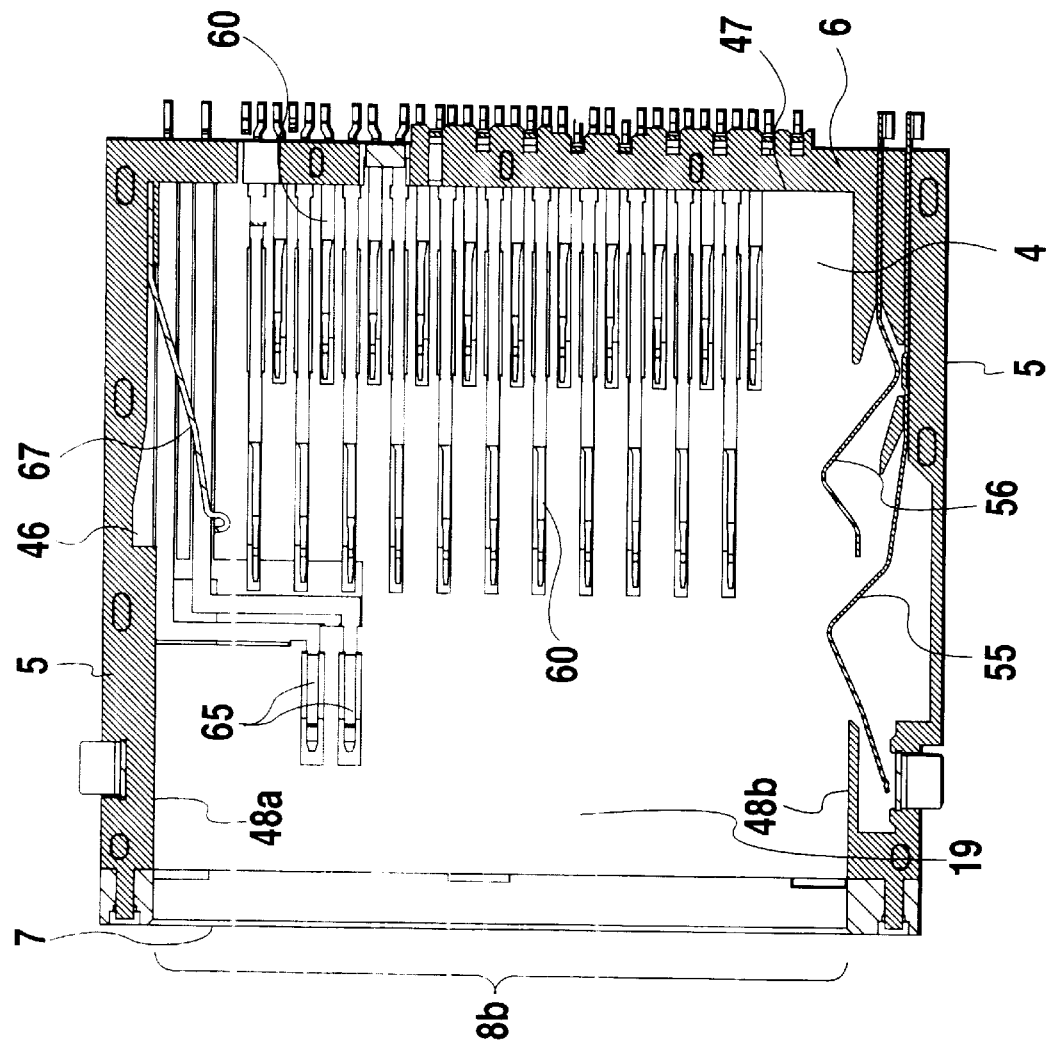
FIG. 6 is a horizontal cross-sectional view of a lower part of the card connector according to the embodiment of the invention.
Figure 7:
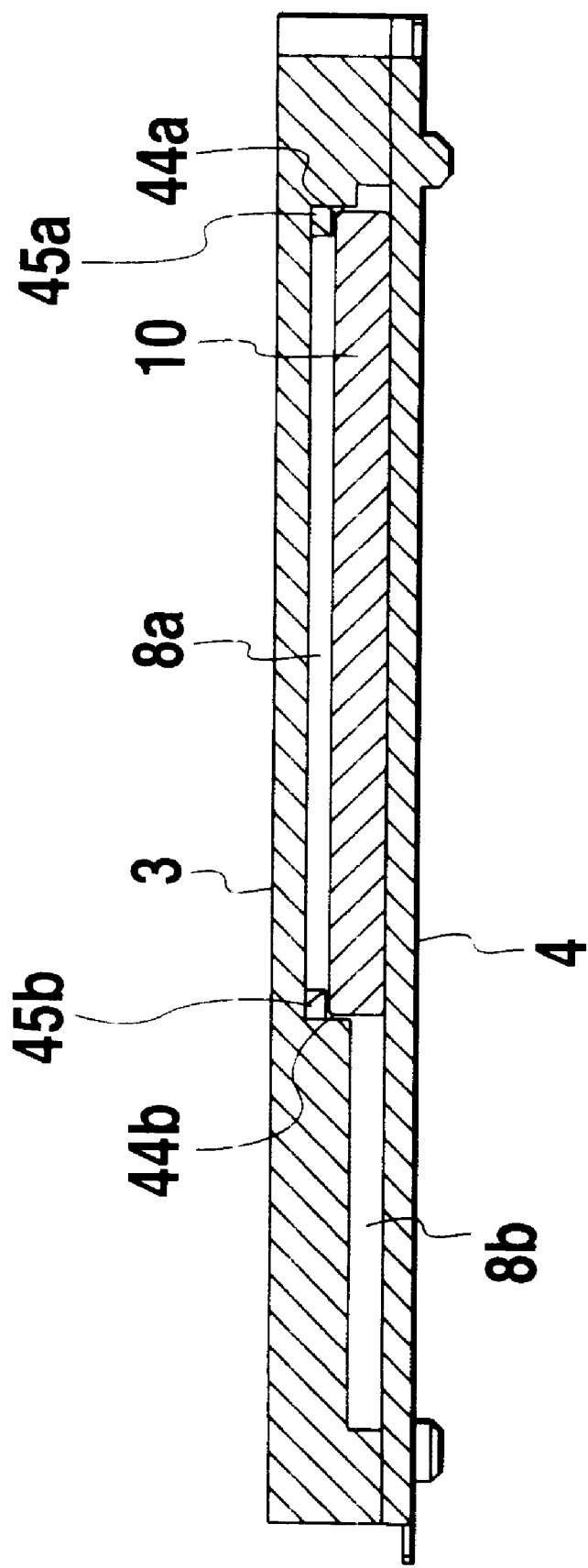
FIG. 7 is a front view of the card connector according to the embodiment of the invention with the 1-stage thickness type card inserted therein.
Figure 8:
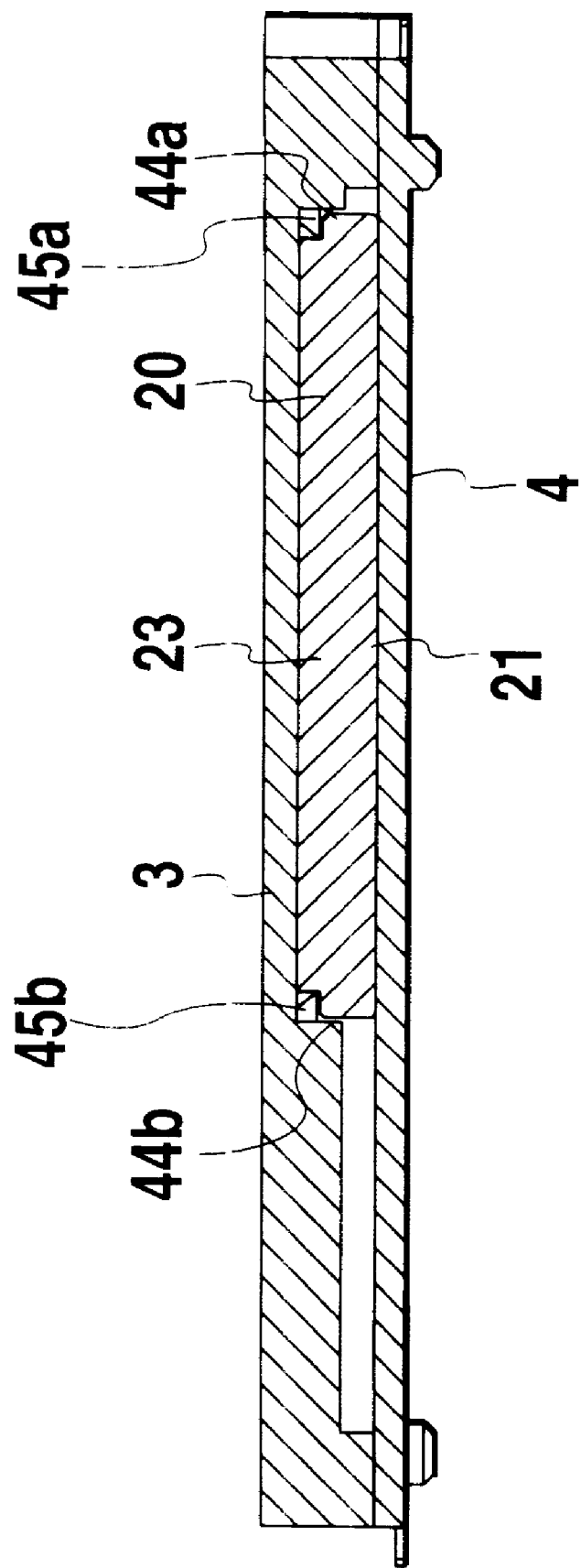
FIG. 8 is a front view of the card connector according to the embodiment of the invention with the 2-stage thickness type card inserted therein.
Figure 9:
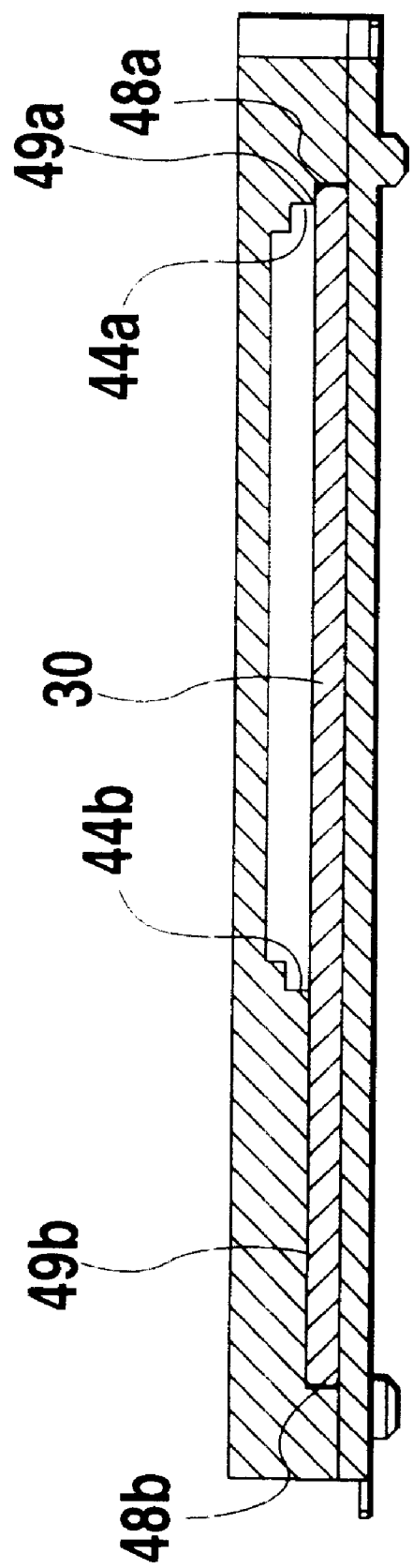
FIG. 9 is a front view of the card connector according to the embodiment of the invention with a thin type card inserted therein.
Figure 10:
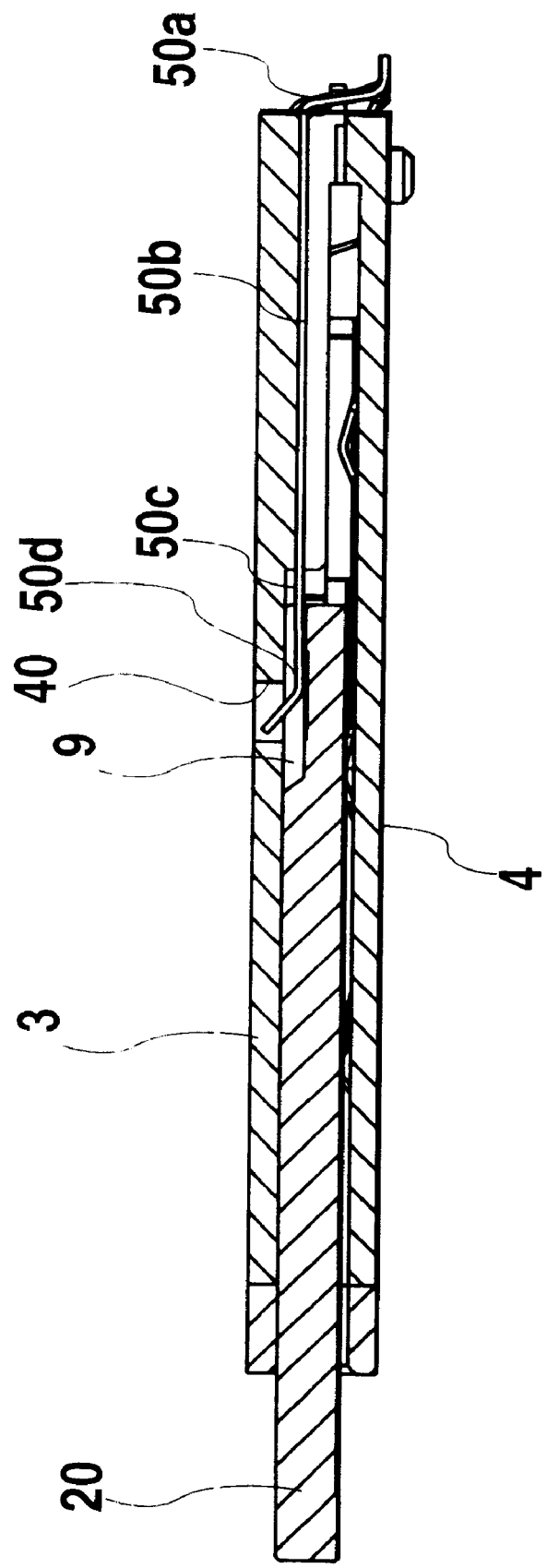
FIG. 10 is a side cross-sectional view of the card connector according to the embodiment of the invention with the 2-stage thickness type card inserted therein.
Figure 11:
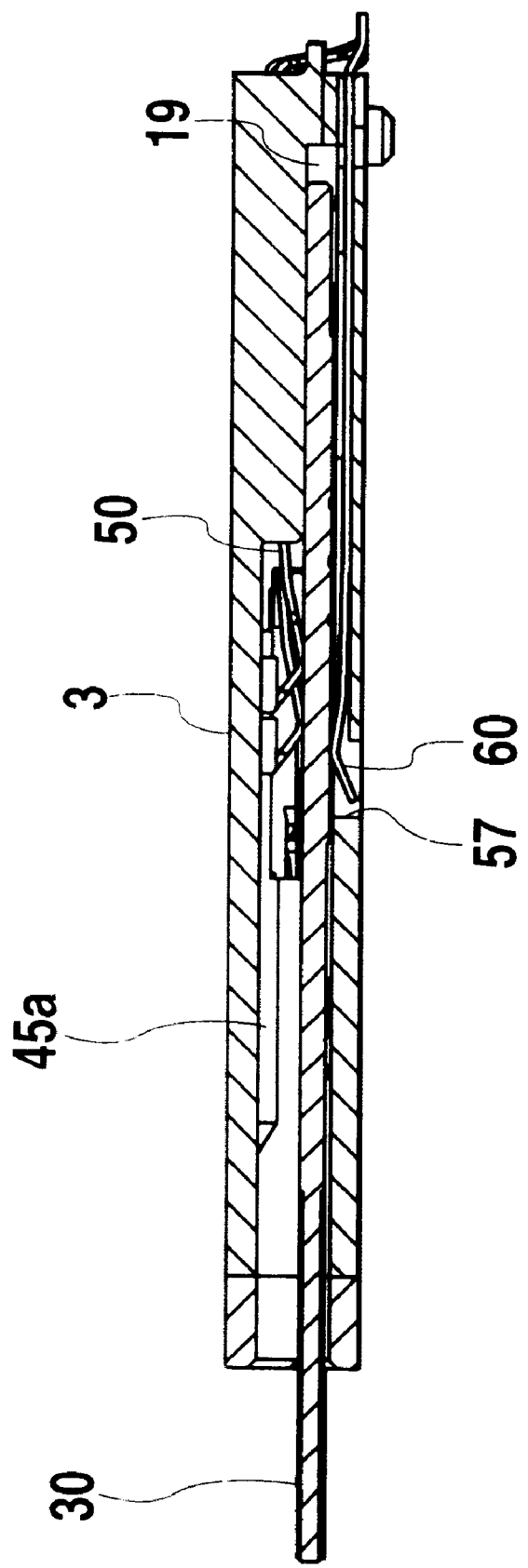
FIG. 11 is a side cross-sectional view of the card connector according to the embodiment of the invention with the thin type card inserted therein.

FIG. 4 is a perspective view showing an external construction of the card connector 1. FIG. 5 is a horizontal cross section of the upper part of the connector. FIG. 6 is a horizontal cross section of the lower part of the connector. FIG. 7 through FIG. 11 show the connector accommodating three different cards, FIG. 7 representing a front view of the connector with the 1-stage thickness type card 10 inserted therein, FIG. 8 representing a front view with the 2-stage thickness type card 20 inserted therein, FIG. 9 representing a front view with the thin type card 30 inserted therein, FIG. 10 representing a side cross-sectional view with the 2-stage thickness type card 20 inserted therein, and FIG. 11 representing a side cross-sectional view with the thin type card 30 inserted therein.

The card connector 1 is mounted on electronic devices such as cellular phones, PDAs, portable audio devices and digital cameras.

This card connector 1 has a connector housing 2 molded of an insulating material such as resin. The connector housing 2 has an upper plate 3, a lower plate 4, side plates 5, a rear plate 6 and a front plate 7. As shown in FIG. 4, the housing upper plate 3 is formed with a plurality of escape holes 40 through which the front ends of the contact terminals of the card escape as they are elastically deformed when the 1-stage thickness type card 10 or 2-stage thickness type card 20 is inserted.

The front plate 7 of the connector housing 2 has a single and common card slot 8 (insertion opening) through which to insert three kinds of cards 10, 20, 30 described earlier into the connector.

The card slot 8 comprises a slot 8a for the 1-stage thickness type card 10 and 2-stage thickness type card 20 and a slot 8b for the thin type card 30 (see FIG. 4 to FIG. 7). A lower part of the slot 8a are shared by all the three cards.

As shown in FIG. 5 and FIG. 10, a first card accommodating portion 9 for the 1-stage thickness type card 10 and 2-stage thickness type card 20 is formed in the housing behind the slot 8a. As shown in FIG. 6 and FIG. 11, a second card accommodating portion 19 for the thin type card 30 is formed in the housing behind the slot 8b.

First, by referring to FIGS. 5, 7, 8 and 10, the construction of the card accommodating portion for the 1-stage thickness type card 10 and 2-stage thickness type card 20 will be explained.

As shown in FIG. 5, the inner surface of the housing upper plate 3 is formed with a plurality of grooves 41, in which a plurality of contact terminals 50 each formed of a cantilevered contact leaf spring are positioned and fitted under pressure.

Each of the contact terminals 50 has a terminal portion 50a soldered to a contact pad of the printed circuit board of the electronic device, a mounting portion 50b secured in the groove 41, a contact leaf spring portion 50c elastically displaced to contact the card 10 or 20, and a contact portion 50d downwardly projecting nearly in an arc (see FIG. 10).

In a housing side wall portion 42 formed in the side plate 5 adjacent to the first card accommodating portion 9, two cantilevered contact springs 55, 56 are provided such that their front end engagement portions are staggered in position. The position of the write protect button 26 of the 2-stage thickness type card 20 is detected according to whether these two contact springs 55, 56 are engaged or disengaged.

In the first card accommodating portion 9 is formed an abutment wall 43 against which the inserted 1-stage thickness type card 10 or 2-stage thickness type card 20 abuts. The abutment wall 43 has a corner wall 53 protruding from one corner thereof that engages the notched portion 12, 22 of the card 10, 20.

In the first card accommodating portion 9 side walls 44a, 44b are formed on the left and right sides, as shown in FIG. 7 and FIG. 8, to guide the 1-stage thickness type card 10 or 2-stage thickness type card 20 as it is inserted or retracted. One of the side walls 44a extends from the slot 8a to the corner wall 53 and the other side wall 44b extends from the slot 8a to the abutment wall 43.

At both upper corners of the first card accommodating portion 9, i.e., on the upper plate 3, stepped portions 45a, 45b are formed to restrict the upward movement of the 1-stage thickness type card 10 by the undersides of the stepped portions 45a, 45b, as shown in FIG. 7.

Further, as shown in FIG. 8, the side surfaces of the lower body portion 23 of the 2-stage thickness type card 20 are guided by the side surfaces of the stepped portions 45a, 45b. Because the 2-stage thickness type card 20 is guided by the side walls 44a, 44b, it is of course possible to simply set the dimensions of the stepped portions 45a, 45b so that the lower body portion 23 of the 2-stage thickness type card 20 is accommodated in the space between the stepped portions 45a, 45b. In that case, the upward movement of the 2-stage thickness type card 20 is limited by the upper plate 3.

The 1-stage thickness type card 10 is inserted into the connector with its surface formed with the contact pads 13 facing up.

When the 1-stage thickness type card 10 is inserted into the card connector 1, the side surfaces of the card 10 are guided by the side walls 44a, 44b, as shown in FIG. 7. The vertical movement of the card 10 is restricted by the lower plate 4 and the undersides of the stepped portions 45a, 45b.

The 2-stage thickness type card 20 also is inserted into the connector with its surface formed with the contact pads 25 facing up.

When the 2-stage thickness type card 20 is inserted into the card connector 1, the side surfaces of the upper body portion 21 of the 2-stage thickness type card 20 are guided by the side walls 44a, 44b, as shown in FIG. 8 and FIG. 10. The lower body portion 23 is accommodated in a space between the stepped portions 45a, 45b. The card 20 is also guided by the stepped portions 45a, 45b. The vertical movement of the card 20 is restricted by the upper plate 3, the lower plate 4, and the undersides of the stepped portions 45a, 45b.

In the 1-stage thickness type card 10, as shown in FIG. 1, the contact pads 13 are situated on the bottom surface of the card body 11. In the 2-stage thickness type card 20, on the other hand, the contact pads 25 are situated on the bottom surface of the upper body portion 21, i.e., in the recesses 24 formed in the lower body portion 23, as shown in FIG. 2.

In the above connector structure, the pad surface of the 1-stage thickness type card 10 is supported by the undersides of the stepped portions 45a, 45b in the direction of height. The bottom surface of the upper body portion 21 is supported by the undersides of the stepped portions 45a, 45b in the direction of height.

In this connector structure, therefore, the distance from the contact pads 13, 25 to the contact portions 50d of the contact terminals 50 of the connector 1 remains the same whichever of the cards 10, 20 is inserted. This gives the contact terminals 50 the same elastic displacement whether the card 10 or 20 is inserted, providing stable contact reliability for both of the cards 10 and 20.

Next, by referring to FIG. 6, FIG. 9 and FIG. 11, the construction of the card accommodating portion for the thin type card 30 will be described.

As shown in FIG. 6, a plurality of contact terminals 60 for the thin type card 30, each formed of a cantilevered contact leaf spring, are arranged on the inner surface of the housing lower plate 4 in the same way as described earlier. The contact terminals 60 are arranged so that the contact portions of the contact leaf springs protrude above the housing lower plate 4. As shown in FIG. 11, the housing lower plate 4 is also formed with a plurality of escape holes 57 that allow the front ends of the contact terminals 60 to escape downwardly when the thin type card 30 is inserted.

On the inner surface of the housing lower plate 4 two contact terminals 65 are arranged to detect the presence or absence of a write protect pad 34 of the thin type card 30.

On the housing side plate 5 on the side of the notched portion 33 is arranged a cantilevered leaf spring 67 that functions as a stopper for preventing an erroneous insertion of the card 30 and as a brake for preventing the card from coming off. When the thin type card 30 is correctly inserted, the leaf spring 67 is pushed sideways by the notched portion 33 into an accommodating portion 46. When the card 30 is inserted upside down or longitudinally reversed, the leaf spring 67 works as a stopper preventing a further insertion of the card.

In the second card accommodating portion 19 formed behind the slot 8b of the housing front plate 7, an abutment wall 47 is formed against which the inserted card 30 abuts.

As shown in FIG. 9, in the second card accommodating portion 19 are formed side walls 48a, 48b for guiding the thin type card 30 as it is inserted or retracted and upper wall surfaces 49a, 49b for restricting the upward movement of the card 30. The upper wall surface 49a and the side wall 48a form a step leading to the side wall 44a. The upper wall surface 49b and the side wall 48b form a step leading to the side wall 44b.

The thin type card 30 is inserted into the connector with its surface formed with the contact pad 32 facing down.

When the thin type card 30 is inserted into the connector 1, the side surfaces of the card 30 are guided by the side walls 48a, 48b. The vertical movement of the card 30 is prevented by the lower plate 4 and the upper wall surfaces 49a, 49b.

According to the first embodiment, the first card accommodating portion 9 for accommodating the 1-stage thickness type card 10 and 2-stage thickness type card 20 and the second card accommodating portion 19 for accommodating the thin type card 30 are formed in the connector housing so that parts of these card accommodating portions can be shared by all the inserted cards. This construction allows different kinds of cards to be inserted through the single card slot 8. In this case, the contact terminals 50 designed to contact the contact pads of the 1-stage thickness type card 10 and 2-stage thickness type card 20 are arranged on the upper plate 3 of the connector housing, and the contact terminals 60 designed to contact the contact pads of the thin type card 30 are arranged on the lower plate 4 of the connector housing.

Therefore, in the first embodiment, three kinds of cards with different shapes and different contact pad positions can be inserted into or retracted from one and the same slot, thereby reducing the space occupied by the card connector, which in turn leads to a reduction in the size of various electronic devices. Further, in the first embodiment, because the contact terminals for different cards are arranged on separate surfaces of the upper plate and the lower plate of the connector housing, various other components can be laid out with more freedom.

In the first embodiment, it is also possible to reverse the arrangement of the card connector 1 such that the thin type card 30 is brought into contact with the contact terminals formed on the upper plate 3 and that the 1-stage thickness type card 10 and 2-stage thickness type card 20 are brought into contact with the contact terminals formed on the lower plate 4.

Further, in the above embodiment, the card connector structure may be arranged so as to accommodate two kinds of cards, the 1-stage thickness type card 10 and the thin type card 30, or the 2-stage thickness type card 20 and the thin type card 30.

Although in the above embodiment the side end of the slot 8a for the 1-stage thickness type card 10 and 2-stage thickness type card 20 is situated at one side of the card connector 1, the slot 8a may be formed at the central part of the housing front plate 7 so that the card slot 8 as a whole is convex-shaped.

[Second Embodiment]

Figure 12:
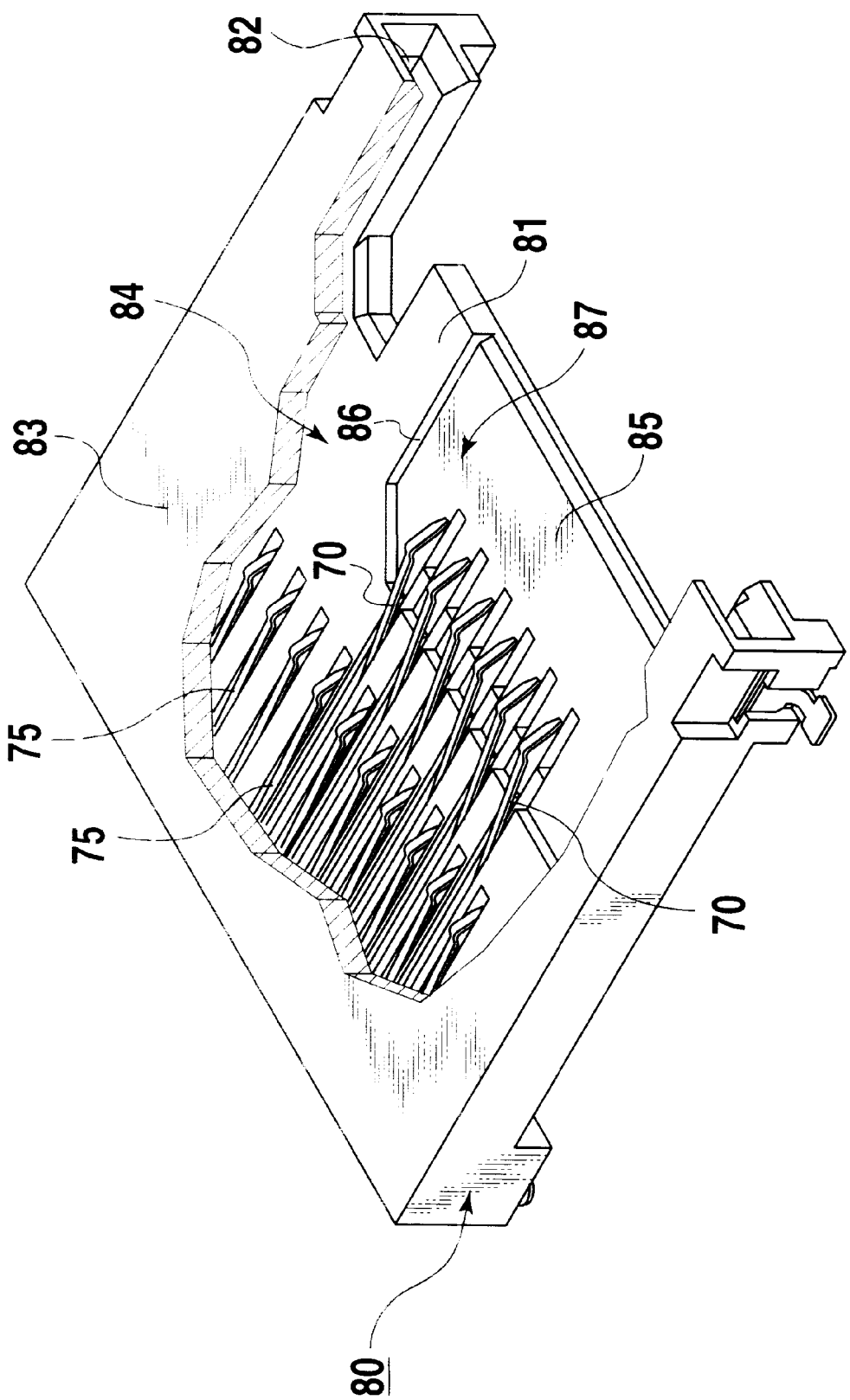
FIG. 12 is a partly cutaway perspective view of the card connector according to another embodiment of the invention.

The second embodiment of the invention is illustrated in FIG. 12.

The second embodiment provides a card connector that is intended for common use with the 1-stage thickness type card 10 shown in FIG. 1 (or 2-stage thickness type card 20 shown in FIG. 2) and with the thin type card 30 of FIG. 3 having a large surface size and a small thickness. It is assumed, however, that the thin type card has contact pads arranged in a single column, not in two columns as with the Smart Media (trade name).

In this second embodiment, contact terminals 70 for thick type cards 10, 20 and contact terminals 75 for thin type card are both arranged in one of the upper and lower surfaces of the connector housing 80 (in this case, on the lower plate 81 side), with their positions staggered.

Therefore, in this case, the thick type card and the thin type card are both inserted into the connector with their contact pad surfaces facing down.

The thin type card has its side surfaces guided by side walls 82 of the connector housing 80, as in the first embodiment, as it is inserted into a second card accommodating portion 84 defined by the side walls 82, the lower plate 81 and the upper plate 83.

The lower plate 81 is formed with a recessed portion 85 for accommodating a part of the thick type cards 10, 20 and guiding them as they are inserted.

The thick type card has a part of its side surfaces guided by side walls 86 of the recessed portion 85 as it is inserted into a first card accommodating portion 87 defined by the recessed portion 85 and a part of the second card accommodating portion 84.

In this embodiment, too, the first card accommodating portion 87 for accommodating the thick type card and the second card accommodating portion 84 for accommodating the thin type card are formed in the connector housing so that a part of these can be commonly used by both of the cards. This construction allows both types of cards to be inserted into the connector through the single card insertion slot. The locations of the first card accommodating portion 87 for the thick type card and of the second card accommodating portion 84 for the thin type card are set so that the positions of the contact terminals 70 for the thick type card and the contact terminals 75 for the thin type card will not overlap each other.

Therefore, in this second embodiment, too, at least two kinds of cards with different external shapes and different contact pad positions can be inserted or retracted through the same slot, thus reducing the space occupied by the card connector, which leads to a size reduction of various electronic devices.

While this embodiment takes the MMC card as an example of the 1-stage thickness type card 10, the SD card as the 2-stage thickness type card 20, and the Smart Media as the thin type card 30, this invention can be applied to any other desired kind of card.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A card connector for exchangeably accommodating at least two cards, or first and second cards, with different thicknesses, different sizes and different alignment positions of a plurality of contact pads, the card connector comprising;
   a first card accommodating portion defined by a pair of side walls for accommodating the first card, the side walls being adapted to guide side surfaces of the first card;
   a second card accommodating portion defined by a pair of side walls for accommodating the second card, the side walls being adapted to guide side surfaces of the second card;
   wherein the first card accommodating portion and the second card accommodating portion are formed in a connector housing so that a part of the first and second card accommodating portions can be used commonly by the first and second cards; and
   wherein a plurality of first contact terminals to be brought into contact with contact pads of the first card are arranged on one of an upper plate and a lower plate of the connector housing, and a plurality of second contact terminals to be brought into contact with contact pads of the second card are arranged on the other plate of the upper plate and the lower plate.

2. A card connector for exchangeably accommodating at least two cards, or first and second cards, with different thicknesses, different sizes and different alignment positions of a plurality of contact pads, the card connector comprising:
   a first card accommodating portion defined by a pair of side walls for accommodating the first card, the side walls being adapted to guide side surfaces of the first card;
   a second card accommodating portion defined by a pair of side walls for accommodating the second card, the side walls being adapted to guide side surfaces of the second card;
   wherein the first card accommodating portion and the second card accommodating portion are formed in a connector housing so that a part of the first and second card accommodating portions can be used commonly by the first and second cards; and
   wherein a plurality of first contact terminals to be brought into contact with contact pads of the first card and a plurality of second contact terminals to be brought into contact with contact pads of the second card are arranged on one of an upper plate and a lower plate of the connector housing and at different positions.

* * * * *